Patented Dec. 21, 1943

2,337,043

UNITED STATES PATENT OFFICE 2,337,043

ART OF PRODUCING CHLORINATED TERPENES FROM TURPENTINE

Torsten Hasselstrom and Burt L. Hampton, Savannah, Ga., assignors to G & A Laboratories, Inc., Savannah, Ga., a corporation of Georgia No Drawing. Application July 13, 1938.
Serial No. 219,101

15 Claims. (Cl. 260—648)

The present invention relates to chlorinated terpenes and compounds thereof and the process of producing the chlorinated terpenes and compounds thereof. An object of this invention is to provide chlorinated terpenes which can be obtained from turpentine by the process of chlorination.

Chlorinated terpenes such as bornyl chloride are known, for example, as being prepared by the action of hydrogen chloride on pinene. Many attempts have been made to chlorinate turpentine in order to obtain corresponding monochloro-terpene compounds (such as, for instance, bornyl chloride) and dichloro-terpenes but such a process has not been found practical since it is well known to the art that the terpenes of turpentine have so great an affinity towards chlorine that the action of chlorine on the terpenes of turpentine causes so great a temperature rise that the terpenes catch fire. The direct chlorination of terpenes has only succeeded in the laboratory by taking certain precautions such as using limited quantities and temperatures below freezing.

The products in accordance with our invention consist substantially of a mixture of bornyl chloride, and mono- and di- and poly-chlorides of unknown composition. The monochlorides may be variously adapted as solvents and for the manufacture of camphene and fenchenes. The dichlorides are useful as raw material for the making of unsaturated monochlorides which may be variously employed in high pressure lubricants; as solvents for nitrocellulose, rubber softeners, as chlorinated rubber, artificial rubber, artificial resins, etc.

Our process requires no complicated equipment and the terpene derivatives may be made by a very simple process of chlorination at ordinary temperatures.

Most specifically our invention comprises the chlorination of turpentine, which may or may not be dried prior to the chlorination. By turpentine, we refer to the terpene mixtures sold commercially under that name, and/or fractions thereof, and the material to be treated may be in either crude or refined state. Our process is carried out by mixing or diluting chlorine with an inert gas such as, for example, carbon dioxide, in such concentrations that the chlorination may proceed at ordinary temperatures without any rapid evolution of heat.

It is also within the contemplation of our invention that the inert gas carries off some of the heat produced by the reaction, and said inert gas may be re-used through the system in a continuous process. It further is feasible to cool the reaction mixture during the chlorination, which procedure is conveniently done with a jacketed chlorination kettle of types commonly used in practice, with or without agitators.

Broadly speaking, our invention comprises the process of chlorination at about room temperature of the terpenes of turpentine in which process the chlorine is mixed with an inert gas in order to avoid a rapid increase in temperature. It has been found practical to adopt a temperature of about 0 to about 70° C. and more particularly a temperature of between 20 to 45° C., that is, a room temperature or slightly above, the heat coming from the course of reaction.

In the process of chlorination of turpentine or fractions thereof, it is preferred to employ a mixture of dry chlorine and carbon dioxide gas. In the beginning of the reaction, chlorine is passed through the reaction mixture in low concentrations relative to the diluent. The ratio of chlorine may be increased during the reaction so that in the end of the reaction concentrated chlorine gas may be employed. Thus, in starting a batch operation, one part of chlorine may initially be used in admixture with 20 parts of carbon dioxide gas, and the proportion of chlorine successively increased while that of carbon dioxide gas is reduced, until the final treatment is being effected by introduction of chlorine alone.

For example, when operating at a temperature of 45° C., the observation of maintenance of this operating temperature enables a determination of the proportion of chlorine to be used, the ratio of chlorine being increased when the temperature falls.

Also we may use chlorine diluted with an inert gas other than carbon dioxide, such as nitrogen, neon, krypton, xenon, helium, methane, vapors of low boiling petroleum or like hydrocarbons, etc.

We may also employ catalysts which facilitate the speed of the reaction, as, for example, iodine, bromine, iron, aluminum chloride, iron chloride, etc.

We may add chlorine to the terpenes in various amounts, as, for instance, up to about 4 atoms; and we may continue the chlorination at boiling temperature until the original terpene molecule becomes saturated with chlorine. We prefer to continue the process of chlorination until about 1 to about 2 atoms of chlorine are added per original terpene molecule.

The crude chlorinated product may be washed with water and/or alkali, such as, for instance, sodium carbonate, sodium hydroxide, lime or calcium oxide or the like before distilling with steam and/or superheated steam at atmospheric pressure and/or in vacuum.

While the present description refers specifically to chlorine, it will be understood that a suitable other halogen, such as bromine, can likewise be employed and is included herein, usually with higher temperatures of reaction and at relatively higher concentrations. A mixture of chlorine and bromine, along with a diluent gas, is capable of employment, particularly when it is desired to treat the products further to obtain hydrocarbons or other derivatives.

Other objects and advantages of our process and products will become apparent in the following examples of the invention which are given for illustrative purposes only and for a better understanding by those skilled in the art:

EXAMPLE I

As an example of carrying out our process, 500 parts by weight of crude gum spirits of turpentine was treated with a stream of a mixture of parts of chlorine and carbon dioxide gas at a temperature of about 25–30° C. for about 24 hours: initially the chlorine:carbon dioxide ratio was about 1:10, and this was successively increased until at about twenty hours, it was 1:1, and finally pure chlorine was introduced. During this period of time 222 parts by weight of chlorine was taken up by the turpentine. The chlorinated product was washed with a dilute sodium carbonate solution to remove excess of hydrogen chloride. For this purpose we used about 1000 parts by weight of a 10 percent solution of sodium carbonate. 1443 g. of chlorinated product was now subjected to steam distillation with ordinary steam and super-heated steam (to a maximum temperature of about 300° C.) whereby 350 parts by weight of a non-volatile brownish residue was obtained. The steam distilled product was dried and fractionated in vacuum whereby the following results were obtained:

Table I

[895 grams were fractionated in vacuum]

| Fraction | Pressure | B. P. | Yield in grams | Appearance | Density at 25° C. | Refractive index at 25° C. |
|---|---|---|---|---|---|---|
| | Mm. | | | | | |
| 1 | 20 | 73–83 | 13 | Waterwhite oil. | 0.8908 | 1.48405 |
| 2 | 20 | 83–88 | 121 | ___do___ | 0.9360 | 1.49107 |
| 3 | 8 | 68–72 | 57 | Very pale yellow oil. | 0.9600 | 1.49165 |
| 4 | 8 | 72–75 | 119 | Waterwhite oil. | 0.9782 | 1.49040 |
| 5 | 8 | 75–78 | 52 | ___do___ | 0.9864 | 1.48897 |
| 6 | 8 | 78–82 | 74 | Pale yellow oil. | 0.9999 | 1.48878 |
| 7 | 8 | 82–100 | 18 | ___do___ | 1.0445 | 1.49922 |
| 8 | 8 | 100–120 | 105 | ___do___ | 1.1074 | 1.50963 |
| 9 | 8 | (¹) | 114 | Semi-solid | | |
| | | | 673 | | | |

¹ Residue.

The fractions 4 and 5 separated a solid on standing. These fractions were therefore chilled to about 0° C. and then filtered. Yield of solid material was 156 grams. This solid material melts at about 128° C. and is apparently bornyl chloride, as it responded to the tests therefor.

The residue also separated solids on standing. 114 grams of residue yielded 10 grams of second solids which, after recrystallization from alcohol, melted at 173° C. The solid is apparently dichlorocamphane, upon test therefor.

The liquid fractions may be used as solvents for rubber, rosin, nitrocellulose and the like. They may also be treated with a reagent capable of splitting off hydrogen chloride such as, for instance, aniline, o-toluidine, soaps, alkali phenolates, etc., to produce unsaturated hydrocarbons of the monocyclic and bicyclic terpene types.

The first solid crude bornyl chloride obtained in the fractions 4 and 5 may be treated with aniline, o-toluidine, soaps, alkali phenolates, etc. to obtain camphene of high purity and excellent yields.

The fractions boiling above 78° C. at 8 mm. pressure may be treated with aniline, o-toluidine, soaps, alkali phenolates, etc., to obtain chlorinated hydrocarbons of the monocyclic and bicyclic terpene types, which can be used as solvents for rubber, nitrocellulose, etc.

Instead of gum spirits of turpentine as such, crude turpentine containing oleorosin may be employed.

EXAMPLE II 500 parts by weight of steam distilled wood turpentine and/or destructively distilled wood turpentine was treated with a stream of a mixture of chlorine and carbon dioxide gas at a temperature of about 15–35° C. for about 18 hours: with an initial concentration of 1:10, and successively enriching as in Example I. During this period of time 222 parts per weight of chlorine was taken up by the turpentine. The chlorinated product was washed with a dilute sodium carbonate solution to remove excess of hydrogen chloride. For this purpose we used about 1000 parts by weight of a 10 percent solution of sodium carbonate. 1450 g. of chlorinated product was now subjected to steam distillation with ordinary steam and superheated steam as in Example I whereby 375 parts by weight of a non-volatile brownish residue was obtained. The steam distilled product was dried and fractionated in vacuum whereby the following results were obtained:

Table II

[830 grams were fractionated in vacuum]

| Fraction | Pressure | B. P. | Yield in grams | Appearance | Density at 25° C. | Refractive index at 25° C. |
|---|---|---|---|---|---|---|
| | Mm. | | | | | |
| 1 | 20 | 55–65 | 41 | Waterwhite oil. | 0.8378 | 1.46722 |
| 2 | 20 | 65–75 | 39 | ___do___ | 0.8801 | 1.47754 |
| 3 | 20 | 75–85 | 34 | ___do___ | 0.9167 | 1.48868 |
| 4 | 8 | 65–70 | 22 | Very pale yellow. | 0.9316 | 1.49080 |
| 5 | 8 | 70–73 | 60 | Waterwhite oil. | 0.9461 | 1.49241 |
| 6 | 8 | 73–75 | 211 | ___do___ | 0.9725 | 1.49050 |
| 7 | 8 | 75–78 | 31 | ___do___ | 0.9870 | 1.48955 |
| 8 | 8 | 75–78 | 18 | ___do___ | 0.9959 | 1.48820 |
| 9 | 8 | 78–95 | 19 | Pale yellow oil. | 1.0162 | 1.49323 |
| 10 | 8 | 95–112 | 33 | Yellow oil | 1.0831 | 1.50871 |
| 11 | | (¹) | 103 | | | |
| | | | 611 | | | |

¹ Residue.

The fractions 6 and 7 separated a solid on standing. These fractions were therefore chilled to about 0° C. and then filtered. Yield of solid material was 97 grams. This solid material melts at about 128° C. and is apparently bornyl chloride upon test therefor.

The residue also separated solids on standing. 103 grams of residue yielded 13 grams of second solids which, after recrystallization from alcohol, melted at 173° C. The solid is apparently dichlorocamphane upon test therefor.

The successive fractions may be treated and utilized as with Example I.

EXAMPLE III 500 parts by weight of crude sulfate turpentine was treated with a stream of a mixture of chlorine and carbon dioxide gas at a temperature of about 25-35° C. for about 20 hours: with an initial concentration of 1:10, and successively enriching as in Example I. During this period of time 220 parts by weight of chlorine was taken up by the turpentine. The chlorinated product was washed with a dilute sodium carbonate solution to remove excess of hydrogen chloride. For this purpose we used about 1000 parts by weight of a 10 percent solution of sodium carbonate. 1439 grams of chlorinated product was now subjected to steam distillation with ordinary steam and superheated steam as in Example I whereby 395 parts by weight of a nonvolatile brownish residue was obtained. The steam distilled product was dried and fractionated in vacuum whereby the following results were obtained:

Table III

[855 grams were fractionated in vacuum]

| Fraction | Pressure | B. P. | Yield in grams | Appearance | Density at 25° C. | Refractive index at 25° C. |
|---|---|---|---|---|---|---|
|  | Mm. |  |  |  |  |  |
| 1 | 8 | 48-63 | 48 | Pale yellow oil. | 0.8988 | 1.48367 |
| 2 | 8 | 63-68 | 119 | ____do____ | 0.9334 | 1.48839 |
| 3 | 8 | 68-72 | 121 | ____do____ | 0.9589 | 1.48820 |
| 4 | 8 | 72-75 | 45 | Very pale yellow. | 0.9681 | 1.48890 |
| 5a | 8 | 75-77 | 109 | Pale yellow oil. | 0.9805 | 1.48801 |
| 5b | 8 | 75-77 | 39 | ____do____ | 0.9935 | 1.48782 |
| 6 | 8 | 77-90 | 13 | Deep yellow oil. | 1.0082 | 1.49128 |
| 7 | 8 | 90-99 | 31 | ____do____ | 1.0295 | 1.49951 |
| 8 | 8 | 99-110 | 26 | ____do____ | 1.0628 | 1.50704 |
| 9 | 8 | 110-120 | 23 | Brownish-yellow. | 1.0950 | 1.51018 |
| 10 | 8 | 120-130 | 54 | ____do____ | 1.1270 | 1.51328 |
| 11 | 8 | 130-138 | 14 | ____do____ | 1.1493 | 1.51635 |
| 12 |  | (¹) | 13 |  |  |  |
|  |  |  | 655 |  |  |  |

¹ Residue.

The fractions 4 and 5 separated a solid on standing. These fractions were therefore chilled to about 0° C. and then filtered. Yield of solid material was 105 grams. This solid material melts at about 128° C. and is apparently bornyl chloride, upon test thereof.

The fractions 10 and 11 also separated on standing. 26 grams of solids which, after recrystallization from alcohol, melted at 173° C. The solid is apparently dichlorocamphane, upon test thereof.

In order to facilitate removal of mercaptans, we may add suitable catalysts for this purpose, such as iodine, manganese dioxide, iron oxide, etc.

The successive fractions may be treated and utilized as with Example I.

EXAMPLE IV

As a further example of carrying out our process, 500 parts by weight of refined sulfate turpentine was treated with a stream of a mixture of chlorine and carbon dioxide gas at a temperature of about 22-34° C. for about 14 hours: with an initial concentration of 1:10, and successively enriching as in Example I. During this period of time 225 parts by weight of chlorine was taken up by the turpentine. The chlorinated product was washed with a dilute sodium carbonate solution to remove excess of hydrogen chloride. For this purpose we used about 1000 parts by weight of a 10 percent solution of sodium carbonate. 1447 grams of chlorinated product was now subjected to steam distillation with ordinary steam and then superheated steam as in Example I whereby 330 parts by weight of a nonvolatile brownish residue was obtained. The steam distilled condensate product was dried and fractionated in vacuum whereby the following results were obtained:

Table IV

[837 grams were fractionated in vacuum]

| Fraction | Pressure | B. P. | Yield in grams | Appearance | Density at 25° C. | Refractive index at 25° C. |
|---|---|---|---|---|---|---|
|  | Mm. |  |  |  |  |  |
| 1 | 8 | 45-63 | 24 | Waterwhite oil. | .8808 | 1.47968 |
| 2 | 8 | 63-68 | 85 | Very pale yellow. | .9337 | 1.49146 |
| 3 | 8 | 68-70 | 152 | Waterwhite oil. | .9719 | 1.49012 |
| 4 | 8 | 70-75 | 70 | ____do____ | .9766 | 1.48993 |
| 5 | 8 | 75-77 | 43 | ____do____ | .9909 | 1.48830 |
| 6 | 8 | 76-80 | 25 | Yellow oil. | 1.0164 | 1.59088 |
| 7 | 8 | 80-105 | 72 | ____do____ | 1.0920 | 1.48945 |
| 8 | 8 | 105-118 | 63 | ____do____ | 1.1405 | 1.48849 |
| 9 |  | (¹) | 92 |  |  |  |
|  |  |  | 626 |  |  |  |

¹ Residue.

The fractions 4, 5 and 6 separated a solid on standing. These fractions were therefore chilled to about 0° C. and then filtered. Yield of solid material was 148 grams. This solid material melts at about 128° C. and is apparently bornyl chloride.

The residue also separated solids on standing. 92 grams of residue yielded 21 grams of second solids which, after recrystallization from alcohol, melted at 173° C. The solid is apparently dichloro-camphane.

Catalytic removal of mercaptans may be effected as with Example III.

The successive fractions may be treated and utilized as with Example I.

Fractions which boil at 45 to 120 degrees C. under a pressure of 8 millimeters are valuable as forming a solvent material, as aforesaid, particularly when the bornyl chloride has been eliminated therefrom by a chilling operation: and the treatment of the initial turpentine thus leads to a chlorinated material, comprised of mono-, di- and poly-chlorides of terpenes: while for particular purposes, a solvent consisting essentially of terpene mono-chlorides may be obtained by selecting for mixing the fractions having boiling points between 45 and 80 degrees C. under a pressure of 8 millimeters, with a separation of bornyl chloride therefrom, and a solvent consisting essentially of di- and poly-chlorides and terpenes can be similarly obtained by utilizing the fractions having a boiling point substantially between 80 and 120 degrees C. under a pressure of 8 millimeters.

The non-volatile residue may be utilized as a solvent in varnishes and lacquers, and for rubber, sulphur, etc.

It is obvious that the illustrative examples do not limit the field within which the invention may be practiced.

The procedure may be practiced by employing the apparatus illustratively set out in our co-filed application, Serial No. 219,100 of even date herewith.

Further, it will be understood that the illustrative examples are indicative of the treatment of turpentines of various origins and that these materials may be subjected to greater or lesser degrees of chlorination, and in other ways the practice may be accomplished without departing from the scope of the appended claims.

We claim:

1. A method of preparing a mixture of chlorinated terpenes, which comprises contacting turpentine with a gaseous mixture of chlorine and an inert diluent gas at a temperature between 0 and 70 degrees C., washing the chlorinated material and distilling it in steam, drying the condensate, and fractionally distilling and collecting liquid fractions having boiling points between 45 and 120 degrees C. under a pressure of 8 millimeters.

2. A method of chlorinating turpentine, which includes the step of contacting turpentine with a gaseous mixture of chlorine and an inert diluent gas at a temperature between 0 and 70 degrees C.

3. A method of chlorinating turpentine, which comprises contacting turpentine with a gaseous mixture of chlorine and an inert diluent gas at a temperature between 20 and 45 degrees C., and increasing the relative concentration of chlorine in the gaseous mixture as the reaction proceeds.

4. A method of preparing a mixture of chlorinated terpenes, which comprises contacting turpentine with a gaseous mixture of chlorine and an inert diluent gas at a temperature between 0 and 70 degrees C., washing the chlorinated matter with an aqueous solution of an alkali and fractionally distilling the chlorinated mixture under reduced pressure, chilling the distillate fractions to about 0 degrees C. whereby to effect separation of solid matters, removing the solid matters and re-mixing the liquids.

5. A method of preparing unsaturated monocyclic terpenes which comprises contacting turpentine with a gaseous mixture of chlorine and an inert diluent gas at a temperature between 0 and 70 degrees C., fractionally distilling the chlorinated mixture and collecting fractions having a boiling point between 80 and 120 degrees C. at a pressure of 8 millimeters, and treating with a reagent selected from the group consisting of aniline, o-toluidine, and alkali phenolates for effecting the splitting off of hydrogen chloride therefrom.

6. A method of preparing a mixture of mono-, di- and poly-chlorinated terpenes which comprises the step of contacting turpentine with a gaseous mixture of chlorine and an inert diluent gas at a temperature between 0 and 70 degrees C. until between one and four chlorine atoms have been absorbed per molecule of turpentine terpenes, and thereafter fractionally distilling the chlorinated material and collecting the fractions having a boiling point between 45 and 120 degrees C. at a pressure of 8 millimeters.

7. A method as in claim 6, in which the contacting is accomplished in the presence of a catalyst selected from the group consisting of iodine, bromine, aluminum chloride and iron chloride.

8. A solvent consisting essentially of a mixture of terpene-chlorides produced by chlorination of turpentine by a gaseous mixture of chlorine and an inert gas at a temperature between 0 and 70 degrees C., and consisting of distillate fractions of the chlorinated material having a boiling point between 45 and 120 degrees C. under a pressure of 8 millimeters.

9. A solvent consisting essentially of a mixture of mono-, di-, and poly-chlorides of terpenes and including chloride-substituted terpenes produced by chlorination of turpentine by a mixture of chlorine and an inert diluent gas at a temperature between 0 and 70 degrees C., and consisting of liquid distillate fractions of the chlorinated material having a boiling point between 45 and 120 degrees C. under a pressure of 8 millimeters, and being substantially free of bornyl chloride.

10. A solvent consisting essentially of terpene monochlorides produced by chlorination of turpentine by a mixture of chlorine and an inert gas at a temperature between 0 and 70 degrees C., and consisting of the fractional distillation products having boiling points between 45 and 80 degrees C. under a pressure of 8 millimeters, and substantially free of bornyl chloride.

11. A solvent consisting essentially of di- and polychlorides of terpenes produced by chlorination of turpentine by a mixture of chlorine and an inert gas at a temperature between 0 and 70 degrees C., and consisting of distillate fractions of the chlorinated material having a boiling point substantially between 80 and 120 degrees C. under a pressure of 8 millimeters.

12. A solvent consisting essentially of unsaturated mono- and dicyclic chlorinated terpenes produced by chlorination of turpentine by a mixture of chlorine and an inert gas at a temperature between 0 and 70 degrees C., and by treatment of the distillate fractions of the chlorinated material boiling between 78 and 120 degrees C. at a pressure of 8 millimeters with a reagent selected from the group consisting of aniline, o-toluidine, and alkali phenolates for splitting hydrogen chloride therefrom.

13. A non-volatile organic solvent for varnish and lacquer bases, rubber, sulphur, and like matters, consisting essentially of residue produced by chlorination of turpentine by a mixture of chlorine and an inert gas at a temperature between 0 and 70 degrees C., followed by washing and steam distillation and a fractional distillation of the condensate to eliminate components having a boiling point below substantially 118 degrees C. under a pressure of 8 millimeters.

14. A solvent having a boiling point above 45 degrees C. at a pressure of 8 millimeters, consisting essentially of a mixture of terpene chlorides produced by chlorination of turpentine by a gaseous mixture of chlorine and an inert gas at a temperature between 0 and 70 degrees C. until between one and four chlorine atoms have been absorbed per molecule of turpentine terpenes, and consisting of liquid distillate fractions having a boiling point above 45 degrees C. at a pressure of 8 millimeters obtained by vacuum redistillation of the condensate liquid from steam distillation of the chlorinated product at temperatures up to 300 degrees C.

15. A method of preparing unsaturated monocyclic terpenes which comprises contacting turpentine with a gaseous mixture of chlorine and an inert diluent gas at a temperature between 0 and 70 degrees C., fractionally distilling the chlorinated mixture and collecting fractions having a boiling point between 80 and 120 degrees C. at a pressure of 8 millimeters, and treating with toluidine for effecting a splitting off of hydrogen chloride therefrom.

TORSTEN HASSELSTROM.
BURT L. HAMPTON.